United States Patent
Toyama (10) Patent No.: US 9,387,816 B2
(45) Date of Patent: Jul. 12, 2016

(54) WIRE HARNESS AND METHOD OF MANUFACTURING THE SAME

(75) Inventor: Eiichi Toyama, Kosai (JP)

(73) Assignee: YAZAKI CORPORATION, Tokyo (JP)

(*) Notice: Subject to any disclaimer, the term of this patent is extended or adjusted under 35 U.S.C. 154(b) by 126 days.

(21) Appl. No.: 13/994,795

(22) PCT Filed: Dec. 28, 2011

(86) PCT No.: PCT/JP2011/080593
§ 371 (c)(1),
(2), (4) Date: Jun. 17, 2013

(87) PCT Pub. No.: WO2012/091171
PCT Pub. Date: Jul. 5, 2012

(65) Prior Publication Data
US 2013/0264114 A1    Oct. 10, 2013

(30) Foreign Application Priority Data
Dec. 28, 2010 (JP) ................. 2010-292018

(51) Int. Cl.
*B60R 16/02* (2006.01)
*H01B 13/012* (2006.01)
*H01R 43/00* (2006.01)
*H01B 7/40* (2006.01)

(52) U.S. Cl.
CPC ............. *B60R 16/02* (2013.01); *B60R 16/0207* (2013.01); *B60R 16/0215* (2013.01); *H01B 13/01263* (2013.01); *H01R 43/00* (2013.01); *H01B 7/40* (2013.01); *Y10T 29/49117* (2015.01)

(58) Field of Classification Search
USPC .............. 174/72 A, 72 R, 68.1; 439/207
See application file for complete search history.

(56) References Cited

U.S. PATENT DOCUMENTS

| | | | |
|---|---|---|---|
| 5,564,731 A | 10/1996 | Gallagher et al. |
| 5,685,930 A | 11/1997 | Gallagher et al. |
| 5,804,121 A | 9/1998 | Gallagher |
| 5,823,599 A | 10/1998 | Gray |
| 5,902,428 A | 5/1999 | Gallagher et al. |
| 5,975,563 A | 11/1999 | Gallagher et al. |
| 6,086,129 A | 7/2000 | Gray |
| 6,086,145 A | 7/2000 | Wandyez |
| 6,158,795 A | 12/2000 | Gray et al. |
| 6,409,947 B1 | 6/2002 | Wandyez |

(Continued)

FOREIGN PATENT DOCUMENTS

| | | |
|---|---|---|
| CN | 1352603 A | 6/2002 |
| CN | 1818446 A | 8/2006 |

(Continued)

OTHER PUBLICATIONS

International Search Report dated May 22, 2012 issued in International Application No. PCT/JP2011/080593 (PCT/ISA/210).

(Continued)

*Primary Examiner* — Dhirubhai R Patel
(74) *Attorney, Agent, or Firm* — Sughrue Mion, PLLC (57) ABSTRACT

A wire harness includes a conductive path and a route holding portion that holds a route of the conductive path. The route holding portion has a cylindrical shape and is comprised of a watercrosslinkable fixing member or a photocrosslinkable fixing member having elastic so that the route holding portion is elastically deformed at least in a radial direction thereof.

14 Claims, 5 Drawing Sheets

(56) References Cited

U.S. PATENT DOCUMENTS

| | | | |
|---|---|---|---|
| 6,837,728 B2 * | 1/2005 | Miyazaki | H01R 9/032 439/271 |
| 7,172,042 B2 * | 2/2007 | Yamaguchi | B60K 6/48 180/65.1 |
| 2002/0043788 A1 | 4/2002 | Gallagher et al. | |
| 2002/0145236 A1 | 10/2002 | Wandyez | |
| 2003/0178085 A1 | 9/2003 | Burke et al. | |
| 2004/0099427 A1 | 5/2004 | Kihira | |
| 2005/0011687 A1 | 1/2005 | Yamaguchi et al. | |
| 2006/0232064 A1 | 10/2006 | Burke et al. | |
| 2006/0232065 A1 * | 10/2006 | Burke et al. | 285/259 |
| 2006/0272845 A1 | 12/2006 | Galey et al. | |
| 2010/0043225 A1 * | 2/2010 | Oga et al. | 29/857 |
| 2013/0306371 A1 * | 11/2013 | Toyama | 174/72 A |

FOREIGN PATENT DOCUMENTS

| | | | | |
|---|---|---|---|---|
| CN | 101508274 A | 8/2009 | | |
| JP | 63-24919 U | 2/1988 | | |
| JP | 11-39969 A | 2/1999 | | |
| JP | 2000-224737 A | 8/2000 | | |
| JP | 2004-224156 A | 8/2004 | | |
| JP | 2008-117617 A | 5/2008 | | |
| JP | 2009-291021 | * | 5/2008 | H02G 3/22 |
| JP | 2009-291021 A | 12/2009 | | |
| WO | 2005/042858 A2 | 5/2005 | | |
| WO | 2005/106305 A1 | 11/2005 | | |

OTHER PUBLICATIONS

Written Opinion dated May 22, 2012 issued in International Application No. PCT/JP2011/080593 (PCT/ISA/237).

Office Action dated Jul. 25, 2014 issued by the Japanese Patent Office in counterpart Japanese Application No. 2010-292018.

Office Action dated Dec. 31, 2014 issued by the State Intellectual Property Office of the People's Republic of China in counterpart Chinese Patent Application No. 201180062922.X.

* cited by examiner

WIRE HARNESS AND METHOD OF MANUFACTURING THE SAME

TECHNICAL FIELD

The present invention relates to a wire harness having a function of route holding and a method of manufacturing the wire harness.

BACKGROUND ART

A wire harness disclosed in the below PTL 1 includes three high voltage electric cables and three metal protection pipes which receive and protect the three high voltage electric cables respectively. The high voltage electric cables are provided to connect a motor that is mounted at front part of a vehicle and an inverter that is mounted at an intermediate part or a rear part of the vehicle each other.

The wire harness is arranged through an underfloor body of the vehicle that is outside of a vehicle frame. Thus, the metal protection pipe is formed to protect the high voltage electric cable from stone splash or water splash. The metal protection pipe has a stiffness to protect the high voltage electric cable from stone splash or water splash and to prevent the high voltage electric cable from bending. Simultaneously, the metal protection pipe also has an electromagnetic shield function since it is made of metal.

The wire harness is manufactured by inserting a high voltage electric cable into a metal protection pipe with a straight state, the inserting is performed to each of the three pipes and then bending the metal protection pipe along arrangement route of the wire harness at the underfloor body of the vehicle. The wire harness is manufactured as described above in a factory of a harness maker, transported to an assembly factory of a vehicle maker and assembled in a predetermined position of the vehicle. Accordingly, the arrangement is completed.

CITATION LIST

Patent Literature

[PTL 1] JP-A-2004-224156

SUMMARY OF INVENTION

Technical Problem

In the above described related art, the metal protection pipe also functions as a route holding portion of the wire harness. As the route holding portion, an example of a proper member besides the metal protection pipe is a protector made of resin.

Regarding the resin protector, there is a problem in that since the resin protector is a molding product that is molded using a mold, the material may be able to be obtained at low cost, however the cost of the protector may increase in a case where the cost of the mold increases. In addition, in a case of production in small quantity, there is a problem in that the cost of the resin protector also increases according to depreciation of the mold. When the cost of the resin protector increases, there is a problem in that the cost of the entire wire harness increases.

The resin protector has a problem in that a lead time of beginning work of the mold is long so that creating of a drawing of the mold should be completed in a short time, as a result, cumbersome design change tends to occur and design man-hours are spent. In addition, when the design is changed, there is a problem in that cost and time are spent. Furthermore, since the resin protector is a dedicated member in each vehicle that is an arrangement object, there is a problem in that versatility is low. If the versatility is low, there is a problem in that it causes the increase of the cost.

Except for that, the resin protector has a problem in that assembly work is performed while considering the route holding, so that working property may be worse.

The invention is made considering above described situation, and an object thereof is to provide a wire harness and a method of manufacturing the wire harness that has a good working property and at low cost, and furthermore has versatility regarding a route holding.

Solution to Problem

In order to solve the above described problem, a wire harness comprising:

a conductive path; and a route holding portion that holds a route of the conductive path, wherein the route holding portion has a cylindrical shape and is comprised of a watercrosslinkable fixing member or a photocrosslinkable fixing member having elastic so that the route holding portion is elastically deformed at least in a radial direction thereof.

Preferably, the wire harness further comprises:

an outer member that is provided outside of the conductive path, wherein the route holding portion holds a route of the outer member.

By the above configuration, desired route holding is realized by providing the watercrosslinkable fixing member or the photocrosslinkable fixing member and hardening the route holding portion. Therefore there is no need to provide a protector. The watercrosslinkable fixing member or the photocrosslinkable fixing member is the member having the cylindrical shape and flexibility at least in the radial direction of the route holding member. When the member is provided at a predetermined portion, the conductive path may be inserted into the route holding portion while a diameter of the route holding portion is widened in the radial direction thereof.

Preferably, a shielded member is provided between the conductive path and the route holding portion.

Preferably, a shielded member is provided between the outer member and the route holding portion.

By the above configuration, not only the route holding may be performed but also the shield function may be added.

Preferably, an electrical connector that is exposed from the route holding portion is provided on the shielded member.

Preferably, an electrical connector that is exposed from the route holding portion is provided on the shielded member.

By the above configuration, the wire harness has the electrical connector that exerts the shield function.

According to the present invention, there is also provided method of manufacturing a wire harness, comprising:

providing a conductive path and a route holding portion that holds a route of the conductive path, the route holding portion having a cylindrical shape and being comprised of a watercrosslinkable fixing member or a photocrosslinkable fixing member having elastic so that the route holding portion is elastically deformed at least in a radial direction thereof;

hardening the route holding portion in a state that the conductive path is inserted into the route holding portion and the conductive path is shaped in a desired shape.

Preferably, the method, further comprising:

an outer member that protects the conductive path, wherein in the hardening process, the route holding portion is hardened in a state that the conductive path and the outer member covering the conductive path are inserted into the route holding portion.

By the above process, the providing process and the hardening process are performed in manufacturing of the wire harness in which the desired route holding may be performed by hardening the route holding portion comprised of the watercrosslinkable fixing member or the photocrosslinkable fixing member.

Preferably, the method further comprises:

inserting the conductive path into the route holding portion while a diameter of the route holding portion is widened in a radial direction thereof before the hardening process; and shrinking a diameter of the route holding portion to intimately contact the route holding portion with the conductive path.

Also, preferably, the method further comprises:

inserting the conductive path and the outer member into the route holding portion while a diameter of the route holding portion is widened in a radial direction thereof before the hardening process; and shrinking a diameter of the route holding portion to intimately contact the route holding portion with the outer member.

By the above process, since the route holding portion comprised of the watercrosslinkable fixing member or the photocrosslinkable fixing member has the cylindrical shape and flexibility, the conductive path may be inserted into the route holding portion while the diameter thereof is widened. After insertion, the fixing member is closely contacted with the predetermined portion by the flexibility.

Advantageous Effects of Invention

In the invention according to the first aspect, there is an advantage in that desired route holding may be performed by providing the route holding portion. In addition, according to the invention, there is an advantage in that the protector is not required so that the versatility may be increased and the cost thereof may be decreased. Furthermore, according to the invention, since regarding the route holding, the watercrosslinkable fixing member or the photocrosslinkable fixing member having the cylindrical shape and flexibility at least in the radial direction is used, there is an advantage in that the working property may be increased. Thus, according to the invention, there is an advantage in that the cost thereof is low and the working property is good so that the wire harness that has the versatility at the route holding may be provided.

Except for that, according to the invention, since the member that is hardened by water or light is used, there is no need to generate heat or perform heat treatment so that the member may be used in manufacturing of the wire harness without problems and also energy may be saved. As a result, there is an advantage in that a further favorable wire harness may be provided. In addition, according to the invention, since the watercrosslinkable fixing member or the photocrosslinkable fixing member having flexibility is used, it is contracted by oneself and is mutually close contacted such that there is an advantage in that enhancement of the working property and decrease of man-hours may be performed, precision of the dimension may easily come about, and variation of work among workers may be not present compared to a case where work such as winding or the like is performed. Furthermore, according to the invention, in order to provide the watercrosslinkable fixing member or the photocrosslinkable fixing member, since the fixing member may be inserted into a predetermined portion, there is an advantage in that a structure that is capable of performing automation in the manufacture may be allowed.

In the invention according to the second aspect, there is an advantage in that the shield function may be added.

In the invention according to the third aspect, there is an advantage in that regarding the adding of the shield function, desired embodiment may be provided.

In the invention according to the fourth aspect, there is an advantage in that the manufacturing method may be provided further favorably wherein the wire harness according to the invention may be manufactured.

In the invention according to the fifth aspect, there is an advantage in that the manufacturing method may be provided wherein the working property is good.

BRIEF DESCRIPTION OF DRAWINGS

FIGS. 1A to 1C are drawings of a wire harness according to a first embodiment of the invention, wherein

FIGS. 2A to 2E are drawings for explaining a method of manufacturing the wire harness according to the invention, wherein

FIGS. 3A to 3C are drawings of the wire harness according to a second embodiment of the invention, wherein

FIGS. 4A to 4E are explanatory views of a process to provide the watercrosslinkable fixing member or the photocrosslinkable fixing member on an outer member, wherein

FIGS. 5A to 5C are drawings of the wire harness according to a third embodiment of the invention, wherein

DESCRIPTION OF EMBODIMENTS

The wire harness is configured such that a watercrosslinkable fixing member or a photocrosslinkable fixing member is hardened and a route holding portion is formed. The watercrosslinkable fixing member or the photocrosslinkable fixing member has a cylindrical shape and flexibility at least in a radial direction thereof. The route holding portion holds the wire harness at a desired route.

First Embodiment

Figure 1A:
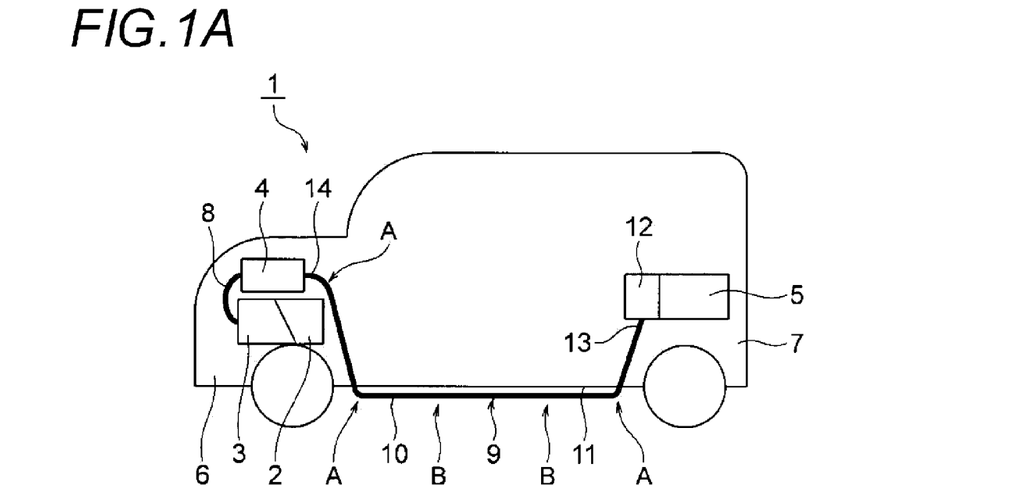
FIG. 1A is a schematic view illustrating an arrangement state of the wire harness.
Figures 1B, 1C:
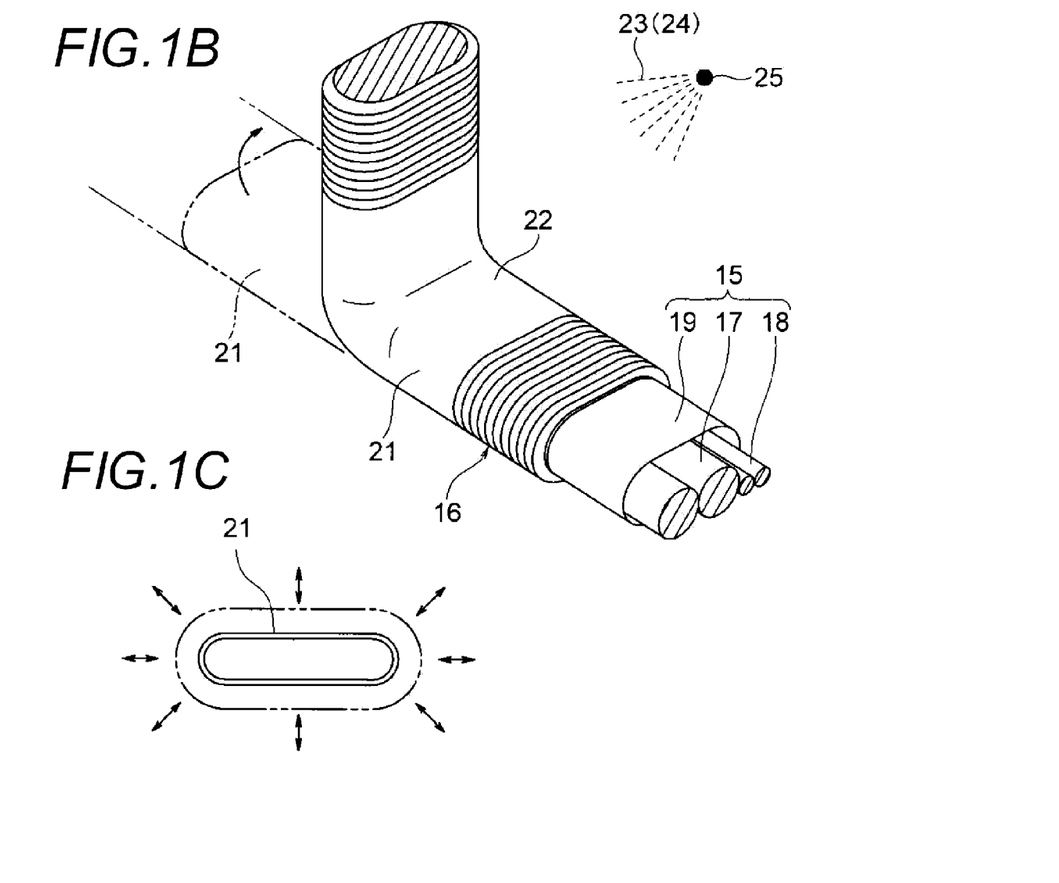
FIG. 1B is a perspective view illustrating a configuration of the wire harness and a route holding portion.
FIG. 1C is an explanatory view regarding a shape and flexibility of a watercrosslinkable fixing member or a photocrosslinkable fixing member.

Hereinafter, a first embodiment will be described with reference to drawings. FIGS. 1A to 1C are drawings of the wire harness according to the first embodiment of the invention. FIGS. 2A to 2E are drawings for explaining a method of manufacturing the wire harness of the invention. In the embodiment, description will be given according to an example of the wire harness of the invention that is employed in a hybrid motor vehicle (may also be an electric vehicle).

In FIG. 1A, reference numeral 1 illustrates the hybrid motor vehicle. In the hybrid motor vehicle 1, the powers of an engine 2 and a motor unit 3 are mixed and drive the vehicle. Electric power is supplied to the motor unit 3 through an inverter unit 4 from a battery 5 (a battery pack). In the embodiment, the engine 2, the motor unit 3 and the inverter unit 4 are mounted in an engine room 6 where front wheels or the like are positioned. In addition, the battery 5 is mounted in a rear part 7 of vehicle where rear wheels or the like is positioned (it may also mounted in an interior of the vehicle that is at rear side of the engine room 6).

The motor unit 3 and the inverter unit 4 are connected by a known high voltage electric cable 8. The battery 5 and the inverter unit 4 are connected by a wire harness 9 of the invention. The wire harness 9 is configured for a high voltage. An intermediate part 10 of the wire harness 9 is arranged at the ground side of an underfloor body 11 of the vehicle. The underfloor body 11 of the vehicle is a known body, a so-called panel member and a through hole (not shown in the drawing) is passed therethrough and formed at a predetermined position.

The wire harness 9 and the battery 5 are connected through a junction block 12 that is provided at the battery 5. A rear end 13 of the wire harness 9 is connected to the junction block 12 with a connector. A rear end 13 side of the wire harness 9 is arranged on the underfloor that is the interior side of the vehicle. A front end 14 side of the wire harness 9 is also arranged on the underfloor. The front end 14 side of the wire harness 9 is connected to the inverter unit 4 with a connector.

Here, supplementary explanation of the embodiment will be given. The motor unit 3 includes a motor and a generator. In addition, the inverter unit 4 includes an inverter and a converter. The motor unit 3 is formed as a motor assembly including a shield case. The inverter unit 4 is also formed as an inverter assembly including a shield case. The battery 5 is a Ni-MH base battery or a Li-ion base battery, and is modulated. In addition, for example, an electricity storage device such as a capacitor may be used. The battery 5 is not specifically limited as long as it may be used in the hybrid motor vehicle 1 or the electric vehicle.

The wire harness 9 is configured such that the intermediate part 10 thereof is arranged along the underfloor body 11 of the vehicle substantially in parallel. In other words, the intermediate part 10 of the wire harness 9 may be arranged so as to keep a distance from the ground. The wire harness 9 is configured and manufactured in a low height structure to keep a distance from the ground (an effective structure of the low height will be described below).

The wire harness 9 includes a conductive path assembly 15 and an outer member 16 opposed to the conductive path assembly 15.

The conductive path assembly 15 includes two high voltage electric cables 17 and low voltage electric cables 18, and an electromagnetic shielded member 19 that integrally shields the two high voltage electric cables 17 and low voltage electric cables 18. The high voltage electric cable 17 is a conductive path including a conductor and an insulator (coating), and is formed so as to have a required length for electrical connection. The conductor is manufactured of copper, copper alloy, aluminum or aluminum alloy. Regarding the conductor, a conductor structure that is formed by twisting element wires, or a conductor structure of a round rod shape of which a cross-section is a rectangular shape or a round shape (for example, a conductor structure is a rectangular single core or a round single core, in this case, the wire itself is also the round rod shape) may be used. The high voltage electric cable 17 has a configuration of a non-shield electric wire. A connector 20 (see FIGS. 2B to 2E) is provided at end of the high voltage electric cable 17 (a connector of the low voltage electric cable 18 side is omitted).

In addition, in the embodiment, the high voltage electric cable 17 is used, however the invention is not limited to the high voltage electric cable 17. In other words, a wire where an insulator is provided at a known bus bar may be used.

The low voltage electric cable 18 is known in the art, and in the embodiment, low voltage electric cable 18 is included in the configuration of the conductive path assembly 15, however the invention is not limited to the embodiment. In other words, it is optional whether or not the low voltage electric cable 18 is included.

The electromagnetic shielded member 19 is a member for electromagnetic shielding (a member for a countermeasure against electromagnetic waves) which covers two high voltage electric cables 17. The electromagnetic shielded member 19 is formed by a shielded member including a conductive metal foil, or a single body of a metal foil or the like having a cylinder shape. The electromagnetic shielded member 19 has substantially the same length as the entire length of the two high voltage electric cables 17. The electromagnetic shielded member 19 is connected to the shield case of the inverter unit 4 through the connector 20 or directly.

In addition, in the embodiment, the electromagnetic shielded member 19 includes the metal foil, however the invention is not limited to the embodiment. In other words, if the countermeasure against electromagnetic waves is possible, for example, a braid having a plurality of extremely fine element wires may be used. The braid is formed in cylindrical shape having conductivity.

As described above, the electromagnetic shielded member 19 is provided because the high voltage electric cable 17 is a non-shield electric wire. In a case where the high voltage electric cable 17 is a known shield electric wire, the electromagnetic shielded member 19 may be not provided on the shield electric wire.

The outer member 16 is a tube shape member having flexibility. The outer member 16 may be various tubes such as a corrugated tube (a bellow tube) made of resin having concavo-convex at an outer surface, a tube made of resin or rubber having no concavo-convex at an outer surface, a tube (a bellow tube) made of metal having concavo-convex at an outer surface or the like. In addition, the outer member 16 is not limited to the round shape in cross-section and it may be a rectangular shape in cross-section, a square shape in cross-section or the like. In the embodiment, the corrugated tube (planar shaped corrugated tube) made of resin having rectangular shape in cross-section is used as the outer member 16.

In the outer member 16, the corrugated tube made of resin having rectangular shape in cross-section is not only a structure that is effective in light weight but also a structure that is effective in a low height, in other words, a structure that is effective to keep a distance from the ground. Accordingly, this is reason that above described corrugated tube is employed in the embodiment (however, the outer member 16 is not limited to the corrugated tube). Preferably, the corrugated tube does not have slits or the like and it is desirable that the outer surface of the corrugated tube is formed to be waterproof.

A plurality of photocrosslinkable fixing members 21 (or watercrosslinkable fixing members) are provided at the outer surface of the outer member 16. The photocrosslinkable fixing members 21 (or the watercrosslinkable fixing members) are provided at a plurality of predetermined portions of the outer member 16. The photocrosslinkable fixing members 21 (or the watercrosslinkable fixing members) are provided at a predetermined portions illustrating arrow A or B in FIG. 1A, in other words, at required portions for route holding such as fixing portions for assembly or bending portions of the wire harness 9 since the outer member 16 has flexibility.

The photocrosslinkable fixing members 21 (or the watercrosslinkable fixing members) are formed of a member that has the cylindrical shape and flexibility at least in radial direction (see FIG. 1C and it may be formed of a member having flexibility in longitudinal direction thereof). In addition, the photocrosslinkable fixing member 21 (or the watercrosslinkable fixing member) may form the route holding portion 22 with respect to the outer member 16 when the photocrosslinkable fixing member 21 (or the watercrosslinkable fixing member) is hardened. Specifically, the photocrosslinkable fixing member 21 (or the watercrosslinkable fixing member) includes a portion that is hardened by light or fluid and a substrate which is integrally formed with the portion.

The photocrosslinkable fixing member 21 includes a hardening portion having a photo irradiating surface and a substrate. The hardening portion of the photocrosslinkable fixing member 21 is hardened by the visible light 23 or a dedicated illumination or the like. The hardening portion is made of photocrosslinkable resin composition and it is a provided on the substrate. It is desirable that a material of the photocrosslinkable fixing member 21 is selectable to adjust the hardening time, for example, instant hardening or slow hardening. The photocrosslinkable fixing member 21 is effective in a case of a working environment where liquid is not preferable (fluid is no problem in usage environment of the wire harness).

The watercrosslinkable fixing member includes a hardening portion having a water absorbing surface and a substrate. The hardening portion of the watercrosslinkable fixing member is hardened by ejecting or dripping of fluid 24 or dipping or the like under water. The hardening portion is made of a watercrosslinkable resin composition and it is provided on the substrate. As the substrate, glass wool, glass cloth, polyester cloth, non-woven cloth or the like may be exemplified (may apply not only to the watercrosslinkable fixing member but also the photocrosslinkable fixing member 21, in addition, glass cloth and polyester cloth are suitable for the dipping of knit weaving and has an advantage that the dipping is performed evenly without unevenness). In addition, as the hardening portion, a watercrosslinkable urethane resin or the like is exemplified. It is desirable that the watercrosslinkable fixing member be capable of adjusting the hardening time similar to the photocrosslinkable fixing member 21. When the watercrosslinkable resin composition is impregnated and held on the substrate, there is an advantage in that usage amount of the resin composition may be suppressed.

The photocrosslinkable fixing member 21 (or the watercrosslinkable fixing member) has the entire length according to a forming range of the route holding portion 22. Otherwise, the photocrosslinkable fixing member 21 is formed in a constant length and provided to overlap each of adjacent end portions. Thus, they may be connected to each other to fit the forming range of the route holding portion 22.

The photocrosslinkable fixing member 21 (or watercrosslinkable fixing member) is formed in a desired thickness beforehand. The photocrosslinkable fixing member 21 is formed in a desired thickness beforehand so that strength thereof may be secured after the route holding portion 22 is formed. In addition, the route holding state may be maintained by the security of the strength. Furthermore, the photocrosslinkable fixing member 21 may has a portion that is strong against stone splash or the like by the security of the strength.

In order to form the route holding portion 22 by hardening the photocrosslinkable fixing member 21 (or the watercrosslinkable fixing member), a applying unit 25 that applies the visible light 23, the dedicated illumination or fluid 24 (see FIG. 1B) is arranged at manufacturing place according to the forming range of the route holding portion 22.

In the manufacturing place, it is certainly that when a jig or a molding is used in the hardening of the route holding portion 22 in a desired shape, the working property becomes better. In FIG. 1B, the state in which the route holding portion 22 is held in a bent shape is illustrated, however it may be held in a shape where twisting is added. In addition, the shape may also be held by bending in a substantially S shape or a crank shape seen from the plane.

When the photocrosslinkable fixing member 21 (or watercrosslinkable fixing member) is hardened, the photocrosslinkable fixing member 21 is entered into a concave portion on the outer surface of the outer member 16 and is caught in a convex portion on the outer surface of the outer member 16 so that the shape and arrangement of the route holding portion 22 is stable.

In a case where counterpart of close contact of the photocrosslinkable fixing member 21 (or the watercrosslinkable fixing member) is for example, olefin resin that is weak in the adhesive force, there is an advantage in that an engagement of the concavo-convex between the photocrosslinkable fixing member 21 (or the watercrosslinkable fixing member) and the outer member 16 effectively prevents a displacement therebetween.

Figure 2A:
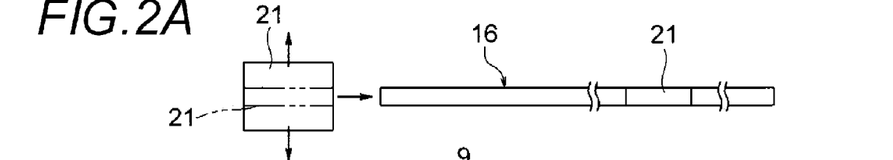
FIGS. 2A and 2B are explanatory views of a process to provide the watercrosslinkable fixing member or the photocrosslinkable fixing member on an outer member.
Figure 2B:
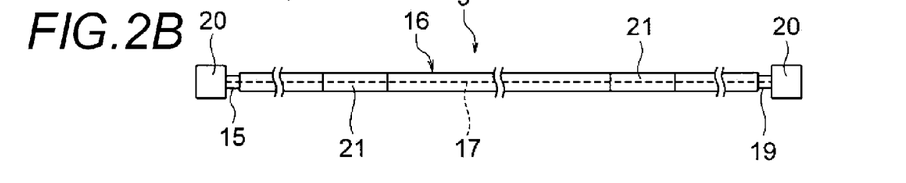

In FIGS. 2A and 2B, manufacturing of the wire harness 9 before transportation is completed by preparing the outer member 16 having the entire length which is a desired length, inserting and providing beforehand the photocrosslinkable fixing member 21 (or watercrosslinkable fixing member) at a predetermined portion of the outer surface of the outer member 16, after that, inserting the conductive path assembly 15 having the entire length which is a desired length into the outer member 16 and providing the connector 20 at the end of the high voltage electric cable 17 that for example, configures the conductive path assembly 15.

Otherwise, manufacturing of the wire harness 9 before transportation is completed by preparing the conductive path assembly 15 and the outer member 16 having the entire length which is a desired length, after that, inserting the conductive path assembly 15 into the outer member 16, inserting and providing the photocrosslinkable fixing member 21 (or watercrosslinkable fixing member) at a predetermined portion of the outer surface of the outer member 16, and providing the connector 20 at the end of the high voltage electric cable 17 that for example, configures the conductive path assembly 15.

The inserting operation of the photocrosslinkable fixing member 21 (or the watercrosslinkable fixing member) is performed by widening the diameter of the photocrosslinkable fixing member 21 (or the watercrosslinkable fixing member)

from a state shown in an imaginary line and in this state, inserting it into a predetermined portion of the outer surface. When the diameter of the photocrosslinkable fixing member 21 (or the watercrosslinkable fixing member) is shrunk (narrowed), it is closely contacted with the outer surface of the outer member 16.

Figure 2C:
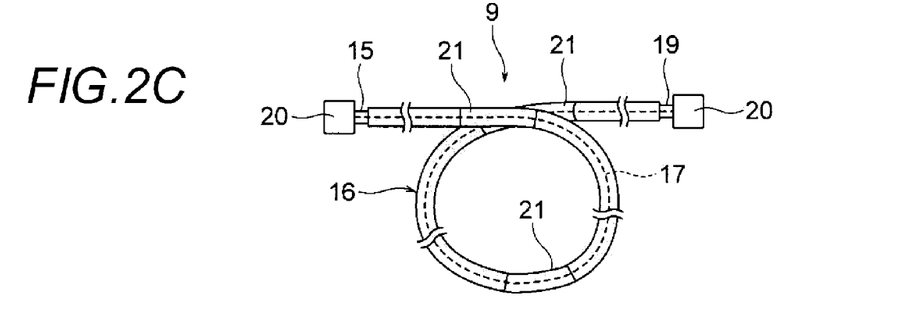
FIG. 2C is an explanatory view of a process according to transportation.

In FIG. 2C, the wire harness 9 that is manufactured as described above is in a state that for example, as shown in drawing, the wire harness 9 is round to be easily transported and accommodated in a box (not shown) or the like so that it is transported for example, to an assembly factory of a vehicle maker.

Figure 2D:
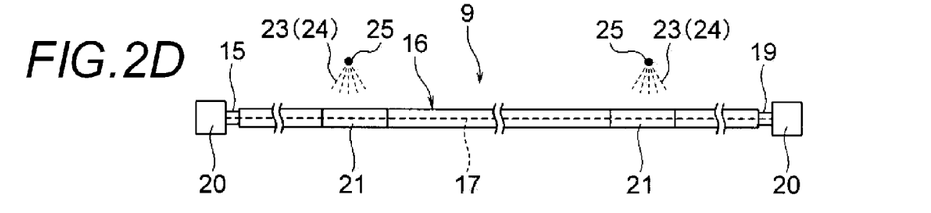
FIG. 2D is an explanatory view of a process according to a formation of the route holding portion.

In FIG. 2D, after the wire harness 9 is transported to the assembly factory, the wire harness 9 is taken out from the box (not shown) and is set in a state of easily handling at the manufacturing factory. Thus, after a portion where the photocrosslinkable fixing member 21 (or the watercrosslinkable fixing member) is provided is formed into a desired shape, the visible light 23, the dedicated illumination or fluid 24 (see FIG. 1B) are supplied.

Figure 2E:
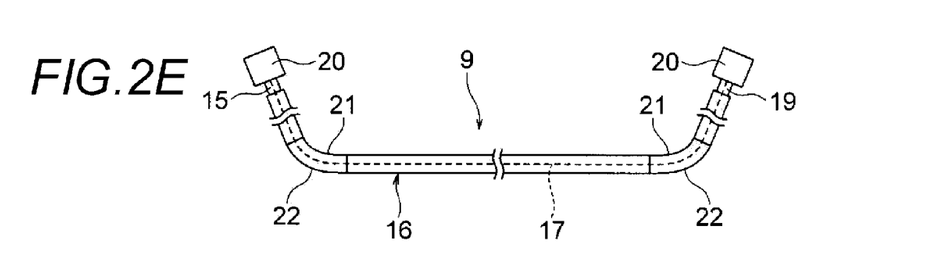
FIG. 2E is an explanatory view of a process according to an assembly.

In FIG. 2E, when the photocrosslinkable fixing member 21 (or watercrosslinkable fixing member) is hardened and the route holding portion 22 is formed, the manufacturing of the wire harness 9 is completed. Thus, when the wire harness 9 is assembled and fixed at the underfloor body 11 of the vehicle (see FIG. 1A) or the like, and when electrical connection or the like is performed, arrangement is completed.

Hereinabove, as described with reference to FIGS. 1A to 2E, there is an advantage in that a desired route may be held by the route holding portion 22 in the wire harness 9. In addition, there is an advantage in that the protector is not required so that the versatility may be increased and the cost thereof is decreased in the wire harness 9. Furthermore, there is an advantage in that since the photocrosslinkable fixing member 21 (or watercrosslinkable fixing member) that has the cylindrical shape and flexibility at least in the radial direction is used regarding the route holding, the working property may be increased in the wire harness 9. Accordingly, there is an advantage in that the cost of the wire harness 9 is low and the working property is good, furthermore, the versatility regarding the route holding is present in the wire harness 9.

Also, since the photocrosslinkable fixing member 21 (or watercrosslinkable fixing member) that is hardened by water or light is used, there is no need to generate heat or perform heat treatment so that it may used in manufacturing the wire harness 9 without any problem as well as energy may be saved. As a result, a further favorable wire harness 9 may be provided. In addition, since the photocrosslinkable fixing member 21 (or the watercrosslinkable fixing member) having flexibility is used, it contracts by itself and is closely contacted with the outer surface, and for example, there is an advantage in that the working property is increased and man-hours may be decreased, precision of dimension may be easily come about, and variation of work among workers may not be present compared to a case where work such as winding or the like is performed. Furthermore, since the photocrosslinkable fixing member 21 (or the watercrosslinkable fixing member) is provided with respect to the outer member 16, and may be inserted into a predetermined portion, the structure that is capable of performing automation in the manufacturing may be allowed.

Second Embodiment

Figure 3A:
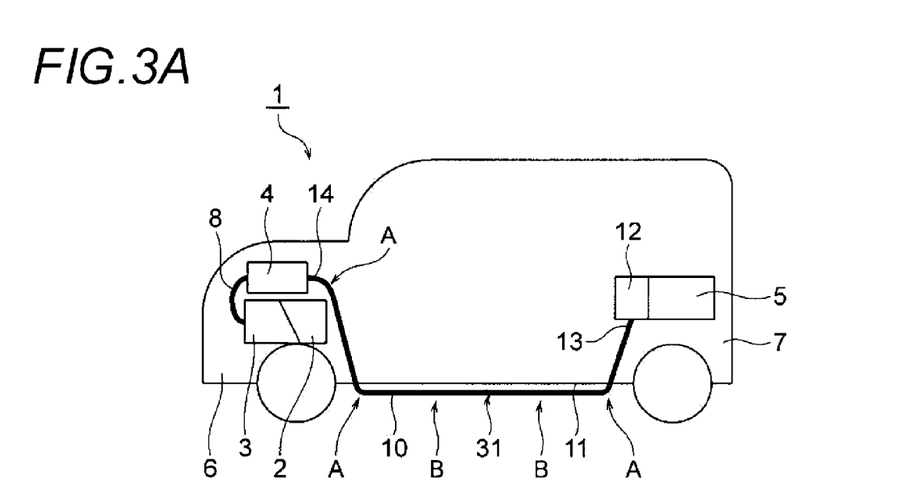
FIG. 3A is a schematic view illustrating an arrangement state of the wire harness.
Figures 3B, 3C:
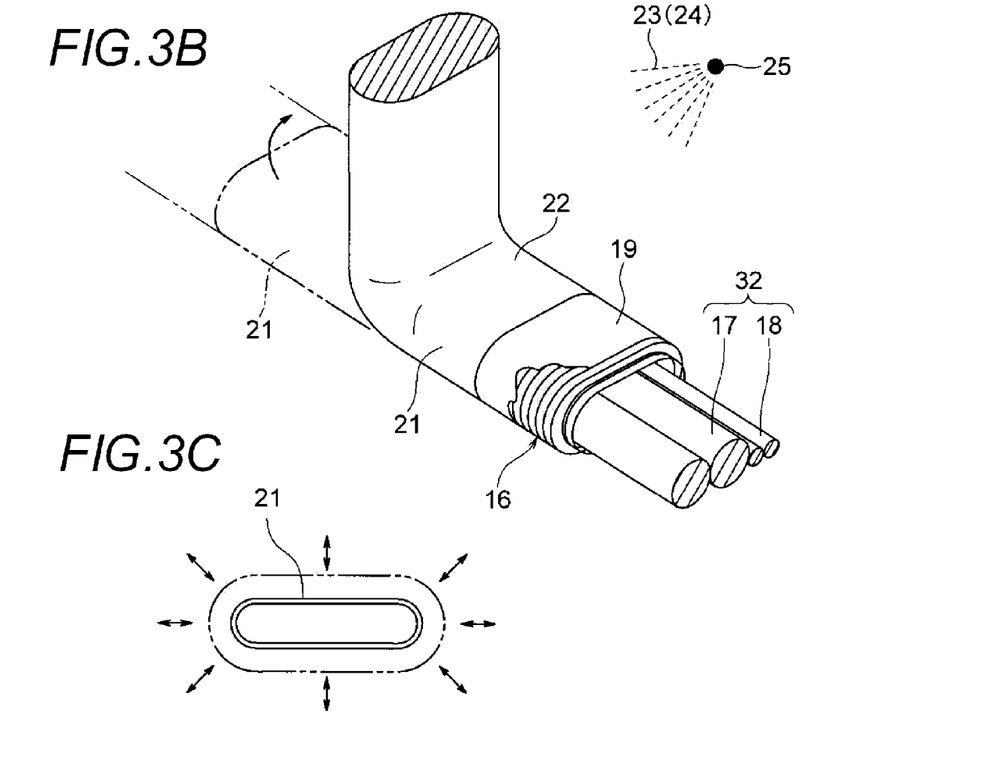
FIG. 3B is a perspective view illustrating the configuration of the wire harness and the route holding portion.
FIG. 3C is an explanatory view of the shape and flexibility of the watercrosslinkable fixing member or the photocrosslinkable fixing member.

Hereinafter, a second embodiment will be described with reference to the drawings. FIGS. 3A to 3C are drawings regarding the wire harness according to the second embodiment of the invention. FIGS. 4A to 4E are explanatory views of a process to provide the shielded member on the outer member and to provide the watercrosslinkable fixing member or the photocrosslinkable fixing member on the shielded member. In addition, the constituent elements similar to those in the first embodiment, described above, are given similar reference numbers thereof, thus not specifically described here.

In FIGS. 3A to 3C, the second embodiment is different from the first embodiment in that the electromagnetic shielded member 19 is arranged at the outside of the outer member 16 in order to exert the shield function and the photocrosslinkable fixing member 21 (or the watercrosslinkable fixing member) is also used to hold and protect the electromagnetic shielded member 19. Hereinafter, detailed description will be given.

A wire harness 31 includes a conductive path assembly 32 and the outer member 16 with respect to the conductive path assembly 32. The conductive path assembly 32 includes two high voltage electric cables 17 and the low voltage electric cables 18.

The outer member 16 has flexibility (planar shaped corrugated tube) and a plurality of the photocrosslinkable fixing members 21 (or the watercrosslinkable fixing members) are provided at the outer surface of the outer member 16 similar to the first embodiment. The photocrosslinkable fixing member 21 (or the watercrosslinkable fixing member) is formed of a member that has the cylindrical shape and flexibility at least in radial direction (see FIG. 3C). In addition, the route holding portion 22 provided at the outer member 16 is formed by hardening the photocrosslinkable fixing member 21 (or the watercrosslinkable fixing member).

As described above, the photocrosslinkable fixing members 21 (or the watercrosslinkable fixing members) are provided at a plurality of predetermined portions of the outer member 16. The photocrosslinkable fixing members 21 (or the watercrosslinkable fixing members) are provided at a predetermined portions shown in arrow A or B in FIG. 3A, in other words, at required portions for route holding such as fixing portions for assembly or bending portions of the wire harness 31 due to the flexibility of the outer member 16.

The electromagnetic shielded member 19 is arranged between the outer surface of the outer member 16 and the photocrosslinkable fixing member 21 (or watercrosslinkable fixing member) in a state of the cylindrical shape. The photocrosslinkable fixing member 21 (or the watercrosslinkable fixing member) is used to hold and protect the electromagnetic shielded member 19 in a state where the outer member 16 is integrally covered. An electrical connector 33 (see FIGS. 4A to 4E) that is exposed from the photocrosslinkable fixing member 21 (or the watercrosslinkable fixing member) is arranged at the end portion of the electromagnetic shielded member 19. The electrical connector 33 is connected to a shield case of the inverter unit 4 or the like through the connector 20 (see FIGS. 2A to 2E) or directly. In addition, regarding the electrical connection, a drain line 34 (see FIGS. 4A and 4E) may be used.

The electromagnetic shielded member 19 may also be used as a magnetic shielded member that is arranged in any place at the outer member 16.

Here, assembly of the outer member 16, the photocrosslinkable fixing member 21 (or watercrosslinkable fixing member) and the electromagnetic shielded member 19 is schematically explained with reference to FIGS. 4A to 4E.

Figure 4A:
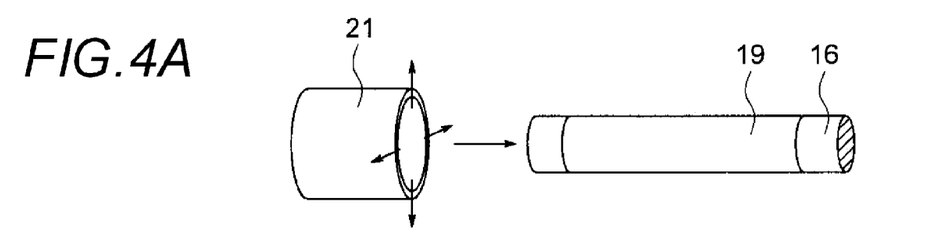
FIGS. 4A to 4C are drawings of a shielded member provided on an outer member according to a first example.
Figure 4B:
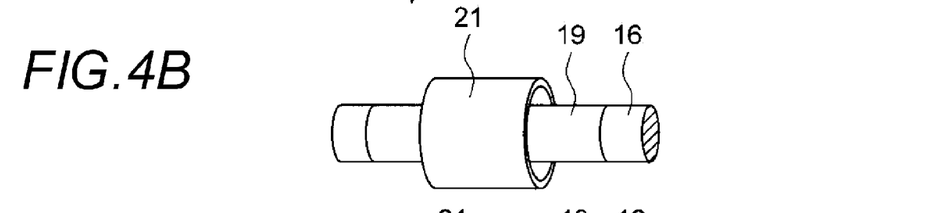
Figure 4C:
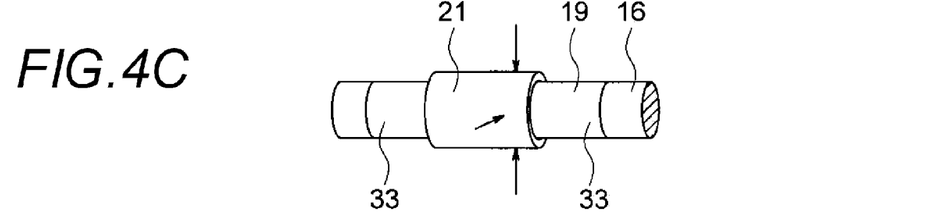

In FIGS. 4A to 4C, first, the outer member 16 having the entire length which is a desired length is prepared, and the electromagnetic shielded member 19 is provided by winding or inserting with respect to the outer surface of the outer member 16. Next, when the photocrosslinkable fixing member 21 (or the watercrosslinkable fixing member) whose diameter is widened in the radial direction is inserted into a predetermined portion of the outer member 16, then the widened state is released, after that, the photocrosslinkable fixing member 21 (or the watercrosslinkable fixing member) is closely contacted to the outer surface by narrowing the diameter by itself in a state where the electromagnetic shielded member 19 is caught therebetween.

Figure 4D:
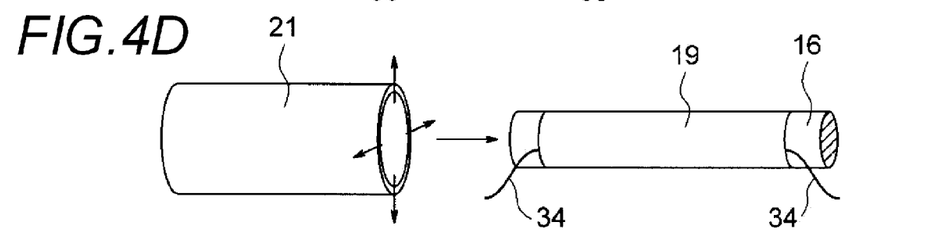
FIGS. 4D to 4E are drawings of the shielded member provided on an outer member according to a second example.
Figure 4E:
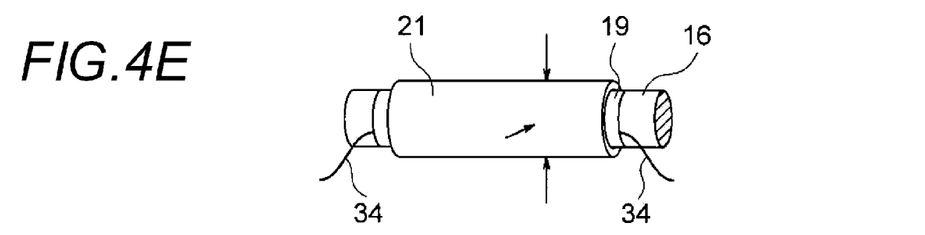

Also, as shown in FIGS. 4D to 4E, even in a case where the drain line 34 is used, assembly may be performed similarly to the above description. In other words, the electromagnetic shielded member 19 is provided along with the drain line 34 with respect to an outer surface of the outer member 16, after that, the photocrosslinkable fixing member 21 (or the watercrosslinkable fixing member) of which the diameter is widened in the radial direction is inserted to a predetermined portion of the outer member 16. Thus, when the widened state is released, the photocrosslinkable fixing member 21 (or the watercrosslinkable fixing member) is closely contacted to the outer surface by narrowing the diameter by itself in a state where the electromagnetic shielded member 19 is caught therebetween.

In addition, the formation of the photocrosslinkable fixing member 21 (or the watercrosslinkable fixing member) is hardened and the route holding portion 22 is similar to FIG. 1B, thus the description thereof is omitted.

As may be appreciated from the above described configuration, structure, assembly or the like, the second embodiment has the advantage similar to the first embodiment.

Third Embodiment

Figure 5A:
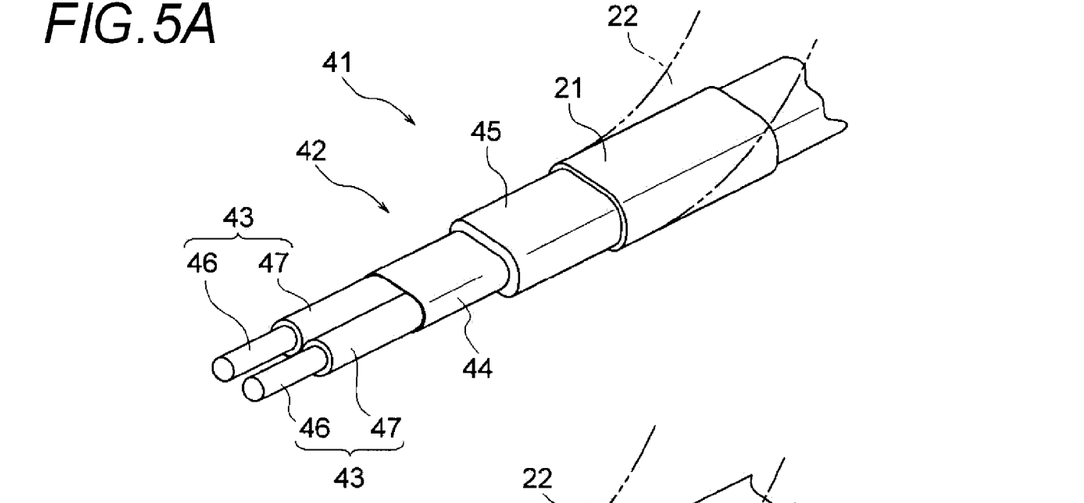
FIGS. 5A to 5C are perspective views illustrating configuration of the wire harnesses and the route holding portions that are different respectively to each other.
Figures 5B, 5C:
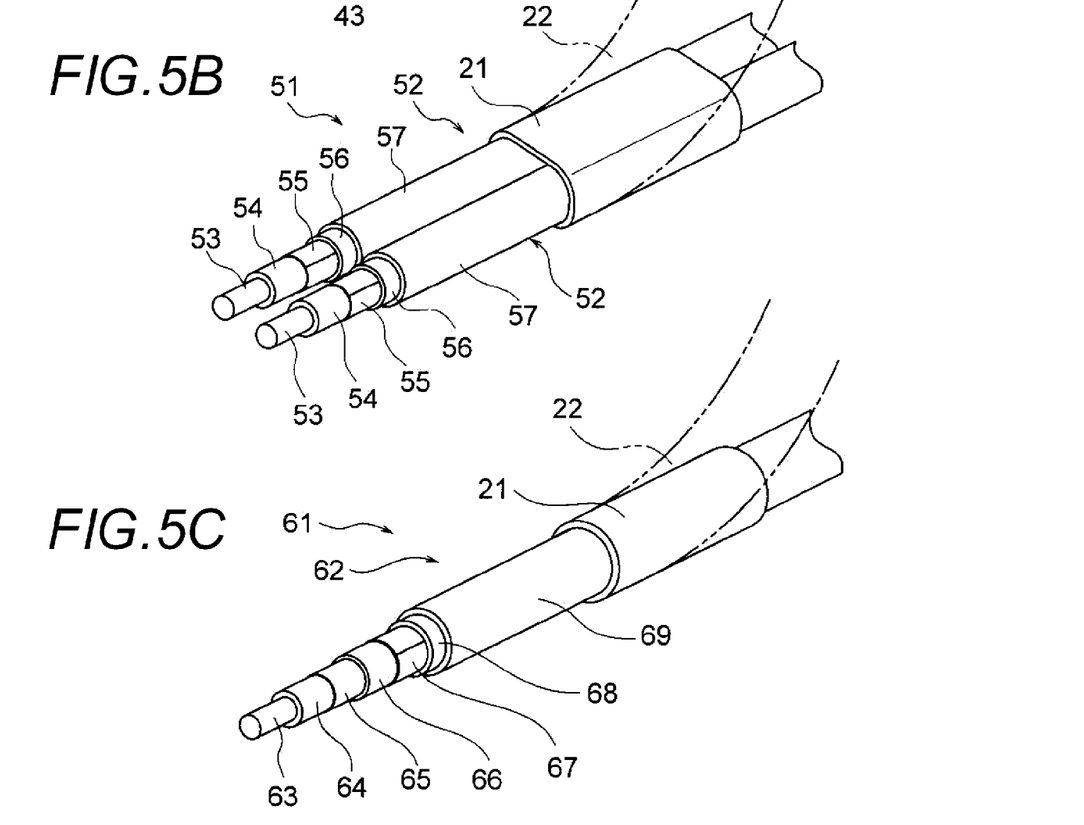

Hereinafter, a third embodiment will be described with reference to drawings. FIGS. 5A to 5C are drawings regarding another example of the wire harness of the invention. In addition, the constituent elements similar to those in the first and second embodiments, described above, are given similar reference numbers thereof, and thus not specifically described in here.

In FIGS. 5A to 5C, the third embodiment is different from the first and the second embodiments in that the third embodiment is an example regarding the route holding at a portion where the outer member is not present or the route holding in a case where the outer member is not required. In the drawing, three types of wire harness 41, 51 and 61 are illustrated. First of all, the wire harness 41 will be described.

In FIG. 5A, a conductive path 42 that configures the wire harness 41 includes a pair of insulated wire cores 43 that are high voltage, a shielded member 44 that is integrally provided in parallel with the pair of the insulated wire cores 43, and a sheath 45 that is provided at outside of the shielded member 44 by extruding and forming process. The insulated wire core 43 includes conductors 46 and insulators 47 that are provided at the outside of the conductors 46. The conductive path 42 is formed as an electric wire without an outer member. The conductive path 42 is formed as an electric wire where various functions such as conduction, electromagnetic shielding, shape holding and protection of the electric wire are integrated.

As the conductor 46, a round rod wire (a conductor structure that is a round single core) made of aluminum or aluminum alloy is used. In addition, a conductor structure that is an angular rod wire (a conductor structure that is a single core having a rectangular shape), a bus bar shape, or a structure that is a conductor of twisted wire may be good. Except for that, regarding the material, the invention is not specifically limited to the embodiment. In other words, it may be made of copper or copper alloy. In the embodiment, it is made of aluminum having an advantage of being low cost and light weight.

The insulator 47 covers the conductor 46 and is formed by extruding and molding a known resin material.

The shielded member 44 is a member for the electromagnetic shield (a member that is countermeasure of electromagnetic wave) that covers a pair of the insulated wire cores 43 and 43 and is formed in the cylindrical shape including conductive metal foil. Otherwise, the shielded member 44 is formed in the cylindrical shape with metal foil single body. The shielded member 44 is formed having a length substantially similar to the entire length of a pair of the insulated wire cores 43 and 43.

In addition, in the embodiment, the shielded member 44 includes the metal foil, however the invention is not limited to the embodiment. In other words, if the countermeasure against electromagnetic waves may be used, for example, a braid having a plurality of extremely fine element wires may be used. The braid that is formed in the cylindrical shape having conductivity is used (the metal foil has an advantage of being considerably light weight compared to the braid).

The sheath 45 is formed by selecting resin material that is favorable to various characteristics such as heat resistance, wear resistance, weather resistance, impact resistance and an extrusion molding property, and is formed by the extrusion and molding. The surface of the sheath 45 is formed as corresponding to the outer surface of the conductive path 42. The sheath 45 is formed to protect the conductive path 42 from stone splash or water splash. The sheath 45 is formed at the conductive path 42 without the outer member.

In the above described conductive path 42, similar to the first and the second embodiments, a plurality of the photocrosslinkable fixing members 21 (or the watercrosslinkable fixing members) are provided. The photocrosslinkable fixing member 21 (or the watercrosslinkable fixing member) is formed of a member that has the cylindrical shape and flexibility at least in radial direction. The wire harness 41 is configured such that the route holding portion 22 is formed at the conductive path 42 by hardening the photocrosslinkable fixing member 21 (or the watercrosslinkable fixing member) so as to hold a desired route.

In FIG. 5B, a conductive path 52 that configures a wire harness 51 is provided in a pair. A pair of the conductive paths 52 includes conductors 53, insulators 54 that are extruded and molded at the outside of the conductor 53, shielded members 55 that are wound outside of the insulators 54, first sheaths 56 and second sheaths 57 that are extruded and molded at outside of the shielded members 55. The conductive path 52 has a configuration similar to a known shield electric wire.

The conductor 53 is used the same as the conductor 46. In addition, the insulator 54 is also used the same as the insulator 47. The shielded member 55 is a member for electromagnetic shield (a member having countermeasure against electromagnetic wave) that is caught between the insulator 54 and the first sheath 56 and is formed in the cylindrical shape as a single body of the conductive metal foil (the braid may be formed).

The conductive path 52 is configured such that the sheath has a two layer structure, however it is not specifically limited. In other words, the sheath is configured by the first sheath 56 and the second sheath 57. The second sheath 57 that is outside thereof is formed to exert the same function as that of the sheath 45. In addition, there is an advantage in that the first sheath 56 and the second sheath 57 have a two layer structure so that a protective function is increased, however the invention is not limited to the embodiment and it may be a one layer structure similar to the sheath 45.

As described above, similar to the first and the second embodiments, a plurality of photocrosslinkable fixing members 21 (or watercrosslinkable fixing members) is provided at a pair of the conductive paths 52. The photocrosslinkable fixing member 21 (or the watercrosslinkable fixing member) is formed of a member that has the cylindrical shape and flexibility at least in radial direction. The wire harness 51 is configured such that the route holding portion 22 is formed at a pair of the conductive paths 52 by hardening the photocrosslinkable fixing member 21 (or the watercrosslinkable fixing member) so that a desired route is held.

In FIG. 5C, a conductive path 62 which configures a wire harness 61 includes a positive electrode conductor 63, an insulator 64 that is extruded and molded at outside of the positive electrode conductor 63, a negative electrode conductor 65 that is provided at outside of the insulator 64, an insulator 66 that is extruded and molded at outside of the negative electrode conductor 65, a shielded member 67 that is wound around outside of the insulator 66, a first sheath 68 and a second sheath 69 that are extruded and molded at outside of the shielded member 67.

The positive electrode conductor 63 is used the same as the conductors 46 and 53. In addition, the insulator 64 and 66 are also used the same as the insulators 47 and 54. Furthermore, the first sheath 68 and the second sheath 69 also use the same as the first sheath 56 and the second sheath 57. In addition, the shielded member 67 is also used the same as the shielded member 55.

The negative electrode conductor 65 is formed in the cylindrical shape that surrounds the positive electrode conductor 63 in a concentric circle in a state where the insulator 64 is caught therebetween. The negative electrode conductor 65 is formed in the same size with respect to the positive electrode conductor 63. In other words, for example, if the size of the positive electrode conductor 63 is 15 sq, the negative electrode conductor 65 is formed such that the size of the negative electrode conductor 65 is 15 sq or more. The reason is that the size of the negative electrode conductor 65 is large so that there is an advantage in that ground connection may be performed and electrical stability may also be enhanced.

Since the positive electrode conductor 63, the negative electrode conductor 65 and the shielded member 67 are arranged in this order, the conductive path 62 is configured such that the conductivity portion forms a concentric three layer structure.

Regarding the conductive path 62, the conductive path 62 can make a pair of the conductive paths 52 in FIG. 5B into one so that there is an advantage in that the saving of the arrangement space may be realized and improvement of lightweightedness thereof may be performed. In addition, in a process regarding the assembly of the wire harness, since two may be one, there is an advantage in that man-hours are decreased. Furthermore, the usage amount of the conductor or insulator may be decreased, such that there is an advantage in that cost of the material may be decreased.

Except for that, since the negative electrode conductor 65 surrounds the positive electrode conductor 63 and the direction of the current that flows in the negative electrode conductor 65 and the positive electrode conductor 63 respectively are reverse so that large shield effect may be expected and noise may not leak to outside. Accordingly, for example, there is an advantage in that risk of malfunction may be decreased.

Similar to the first and the second embodiment, a plurality of the photocrosslinkable fixing members 21 (or the watercrosslinkable fixing members) is provided at the conductive path 62. The photocrosslinkable fixing members 21 (or the watercrosslinkable fixing members) are formed of a member that has the cylindrical shape and flexibility at least in the radial direction. The wire harness 61 is configured such that the route holding portion 22 is formed at the conductive path 62 by hardening the photocrosslinkable fixing member 21 (or the watercrosslinkable fixing member) so that a desired route is held.

In addition, the invention is not limited to the conductive paths 42, 52 and 62, the conductive path may be configured of known electric wire that is bundle of fine electric wires and the photocrosslinkable fixing member 21 (or the watercrosslinkable fixing member) is provided at the conductive path so that the route holding portion 22 may be formed.

Except for that, it goes without saying that the invention may be variously modified without departing from the gist of the invention.

The present application is based on Japanese Patent Application No. 2010-292018 filed on Dec. 28, 2010, the contents of which are incorporated herein by reference.

INDUSTRIAL APPLICABILITY

By this invention, a wire harness and a method of manufacturing the wire harness having a good working property and at low cost, and furthermore having versatility regarding a route holding can be achieved.

REFERENCE SIGNS LIST

1 . . . hybrid motor vehicle
2 . . . engine
3 . . . motor unit
4 . . . inverter unit
5 . . . battery
6 . . . engine room
7 . . . rear part of vehicle
8 . . . high voltage wire harness
9 . . . wire harness
10 . . . intermediate part
11 . . . underfloor body of vehicle
12 . . . junction block
13 . . . rear end
14 . . . front end
15 . . . conductive path assembly
16 . . . outer member
17 . . . high voltage electric cable (conductive path)
18 . . . low voltage electric cable (conductive path)
19 . . . electromagnetic shielded member (shielded member)
20 . . . connector
21 . . . photocrosslinkable fixing member
22 . . . route holding portion
23 . . . visible light
24 . . . fluid
25 . . . applying unit
31 . . . wire harness
32 . . . conductive path assembly
33 . . . electrical connector
34 . . . drain line
41, 51, 61 . . . wire harness
42, 52, 62 . . . conductive path

The invention claimed is:

1. A wire harness comprising:
a conductive path; and
a route holding portion that holds a route of the conductive path,
wherein the route holding portion has a cylindrical shape and is comprised of a watercrosslinkable fixing member having elasticity in at least a radial direction so that the route holding portion is configured to be elastically deformed at least in a radial direction thereof,
wherein the watercrosslinkable fixing member includes a hardening portion having a water absorbing surface and a substrate, the hardening portion of the watercrosslinkable fixing member being hardened by ejecting the dripping of fluid or dipping under water to hold the route of the conductive path with a bent shape.

2. The wire harness according to claim 1, further comprising:
an outer member that is provided outside of the conductive path,
wherein the route holding portion holds a route of the outer member.

3. The wire harness according to claim 2, wherein a shielded member is provided between the outer member and the route holding portion.

4. The wire harness according to claim 3, wherein an electrical connector that is exposed from the route holding portion is provided on the shielded member.

5. The wire harness according to claim 1, wherein a shielded member is provided between the conductive path and the route holding portion.

6. The wire harness according to claim 5, wherein an electrical connector that is exposed from the route holding portion is provided on the shielded member.

7. The wire harness according to claim 1, further comprising:
wherein the watercrosslinkable fixing member includes a portion configured to be hardened by the fluid such that as a result of the portion being exposed to the fluid, the portion is deformed in at least the radial direction to hold the route holding portion in the bent shape.

8. A method of manufacturing a wire harness, comprising:
providing a conductive path and a route holding portion that holds a route of the conductive path, the route holding portion having a cylindrical shape and being comprised of a watercrosslinkable fixing member having elasticity in at least a radial direction so that the route holding portion is elastically deformed at least in a radial direction thereof; wherein the watercrosslinkable fixing member includes a hardening portion having a water absorbing surface and a substrate, hardening the route holding portion and the hardening portion of the watercrosslinkable fixing member in a state that the conductive path is inserted into the route holding portion and the conductive path is shaped in a bent shape by exposing the watercrosslinkable fixing member to a fluid.

9. The method according to claim 8, further comprising:
providing an outer member that protects the conductive path,
wherein in the hardening process, the route holding portion is hardened in a state that the conductive path and the outer member covering the conductive path are inserted into the route holding portion.

10. The method according to claim 9, further comprising:
inserting the conductive path and the outer member into the route holding portion while a diameter of the route holding portion is widened in a radial direction thereof before the hardening process; and
shrinking a diameter of the route holding portion to intimately contact the route holding portion with the outer member.

11. The method according to claim 8, further comprising:
inserting the conductive path into the route holding portion while a diameter of the route holding portion is widened in a radial direction thereof before the hardening process; and
shrinking a diameter of the route holding portion to intimately contact the route holding portion with the conductive path.

12. The method according to claim 8, further comprising:
wherein the watercrosslinkable fixing member includes a portion configured to be hardened by the fluid such that as a result of the portion being exposed to at least one of light and fluid, the portion is deformed in at least the radial direction to hold the route holding portion in the bent shape.

13. A wire harness comprising:
a conductive path; and
a route holding portion that holds a route of the conductive path,
wherein the route holding portion has a cylindrical shape and is comprised of a photocrosslinkable fixing member having elasticity in at least a radial direction so that the route holding portion is configured to be elastically deformed at least in a radial direction thereof,
wherein the photocrosslinkable fixing member includes a hardening portion having a photo irradiating surface and a substrate, the hardening portion of the photocrosslinkable fixing member being hardened by visible light or a dedicated illumination to hold the route of the conductive path with a bent shape.

14. A method of manufacturing a wire harness, comprising:
providing a conductive path and a route holding portion that holds a route of the conductive path, the route holding portion having a cylindrical shape and being comprised of a photocrosslinkable fixing member having elasticity in at least a radial direction so that the route holding portion is elastically deformed at least in a radial direction thereof; wherein the photocrosslinkable fixing member includes a hardening portion having a photo irradiating surface and a substrate, hardening the hardening portion of the photocrosslinkable fixing member and the route holding portion by visible light or a dedicated illumination in a state that the conductive path is inserted into the route holding portion and the conductive path is shaped in a bent shape by exposing the photocrosslinkable fixing member to a light.

* * * * *